(12) United States Patent
Boos

(10) Patent No.: US 8,254,860 B2
(45) Date of Patent: Aug. 28, 2012

(54) TRANSCEIVER ARRANGEMENT AND METHOD FOR PROCESSING A SIGNAL

(75) Inventor: Zdravko Boos, München (DE)

(73) Assignee: Intel Mobile Communications GmbH, Neubiberg (DE)

( * ) Notice: Subject to any disclaimer, the term of this patent is extended or adjusted under 35 U.S.C. 154(b) by 800 days.

(21) Appl. No.: 11/705,258

(22) Filed: Feb. 12, 2007

(65) Prior Publication Data

US 2007/0197170 A1    Aug. 23, 2007

(30) Foreign Application Priority Data

Feb. 10, 2006  (DE) .......................... 10 2006 006 291

(51) Int. Cl.
*H03D 7/16* (2006.01)
*H04B 17/02* (2006.01)

(52) U.S. Cl. ....................... 455/131; 455/137

(58) Field of Classification Search .......... 455/131–137, 455/139, 141, 144, 146, 149, 205, 207, 209, 455/226.2, 226.3, 115.3, 73
See application file for complete search history.

(56) References Cited

U.S. PATENT DOCUMENTS

| 7,203,470 B2 * | 4/2007 | Seo ............................. 455/139 |
| 7,363,016 B2 | 4/2008 | Lee | |
| 7,383,063 B2 * | 6/2008 | Forrester .................... 455/562.1 |
| 2004/0106381 A1 | 6/2004 | Tiller | |
| 2005/0227631 A1 | 10/2005 | Robinett | |

FOREIGN PATENT DOCUMENTS

| CN | 1514554 A | 7/2004 |
| DE | 699 26 309 T2 | 5/2006 |
| EP | 0 966 115 A2 | 12/1999 |

OTHER PUBLICATIONS

"A Low-Complexity Antenna Diversity Receiver Suitable for TDMA Handset Implementation", Chun-Ning Zhang, William K. Lam and Curtis C. Ling, IEEE 47th Vehicular Technology Conference, 1997, vol. 3, May 4-7, 1997, pp. 1753-1757.

* cited by examiner

*Primary Examiner* — Eugene Yun
(74) *Attorney, Agent, or Firm* — Eschweiler & Associates, LLC

(57) ABSTRACT

A transceiver arrangement includes a first receive path with a first connection and a first receive amplifier, and a second receive path with a second connection, a second receive amplifier, and a frequency conversion device. A controllable coupling device is configured to couple an output of the first receive amplifier to an input of the frequency conversion device on the second signal path. Furthermore, the transceiver arrangement includes a control circuit configured to deliver a control signal to the coupling device for combining signals delivered by the first and second receive amplifier in the correct phase based on a signal supplied by the receive paths. This achieves receive diversity wherein, on the one hand, additional external components are no longer necessary and, on the other hand, adequate signal quality is ensured even with a simultaneous transmit process of the transceiver arrangement.

17 Claims, 3 Drawing Sheets

1a

TRANSCEIVER ARRANGEMENT AND METHOD FOR PROCESSING A SIGNAL

REFERENCE TO RELATED APPLICATIONS

This application claims the benefit of the priority date of German application DE 10 2006 006 291.4, filed on Feb. 10, 2006, the contents of which are herein incorporated by reference in their entirety.

FIELD OF THE INVENTION

The invention relates to a transceiver arrangement and to a method for processing a signal, particularly for mobile radio.

BACKGROUND

The number of possible applications and the flexibility of communication devices, particularly of mobile communication devices, has risen greatly in recent times. Thus, modern communication devices are capable of simultaneously receiving and transmitting signals according to various mobile communication standards. Communication devices which can be designated as third generation can receive, for example, signals according to the WCDMA/UMTS mobile radio standard and according to the GSM or EDGE mobile radio standards. This enables a user to be available in regions with different availability or different so-called network coverage.

The high flexibility with regard to a use of mobile communication standards takes into account the growing needs of the users to provide, on the one hand, for different applications and, on the other hand, for high data transmission rates. The demand for high data transmission rates and mobility leads to the use of diversity receivers. In these types of receivers, the useful or mobile radio signal is received via more than one antenna and the received signal components are processed further jointly. This makes it possible to compensate for slight disturbances on the signal path, for example due to interference, and thus to guarantee adequate signal quality for high data transmission rates.

The various requirements for the mobile communication device or for the transmitting and receiving stages within the device possibly need a high number of additional external components for the individual applications. These include, among other things, narrow-band filters, which aid in suppression of interference signal components in the received signals for improving a useful-signal/noise proportion. The needed components require additional space and increase the production costs.

The increase in requirements for miniaturization and integration of circuits leads to a desire for providing a transceiver arrangement with the least possible number of external components. As well, methods for receiving a signal would be desirable by means of which the number of components needed can be reduced.

BRIEF DESCRIPTION OF THE FIGURES

Various embodiments and aspects of the invention will now be explained in detail, taking into consideration the drawings, in which.

DETAILED DESCRIPTION OF THE INVENTION

Figure 1:
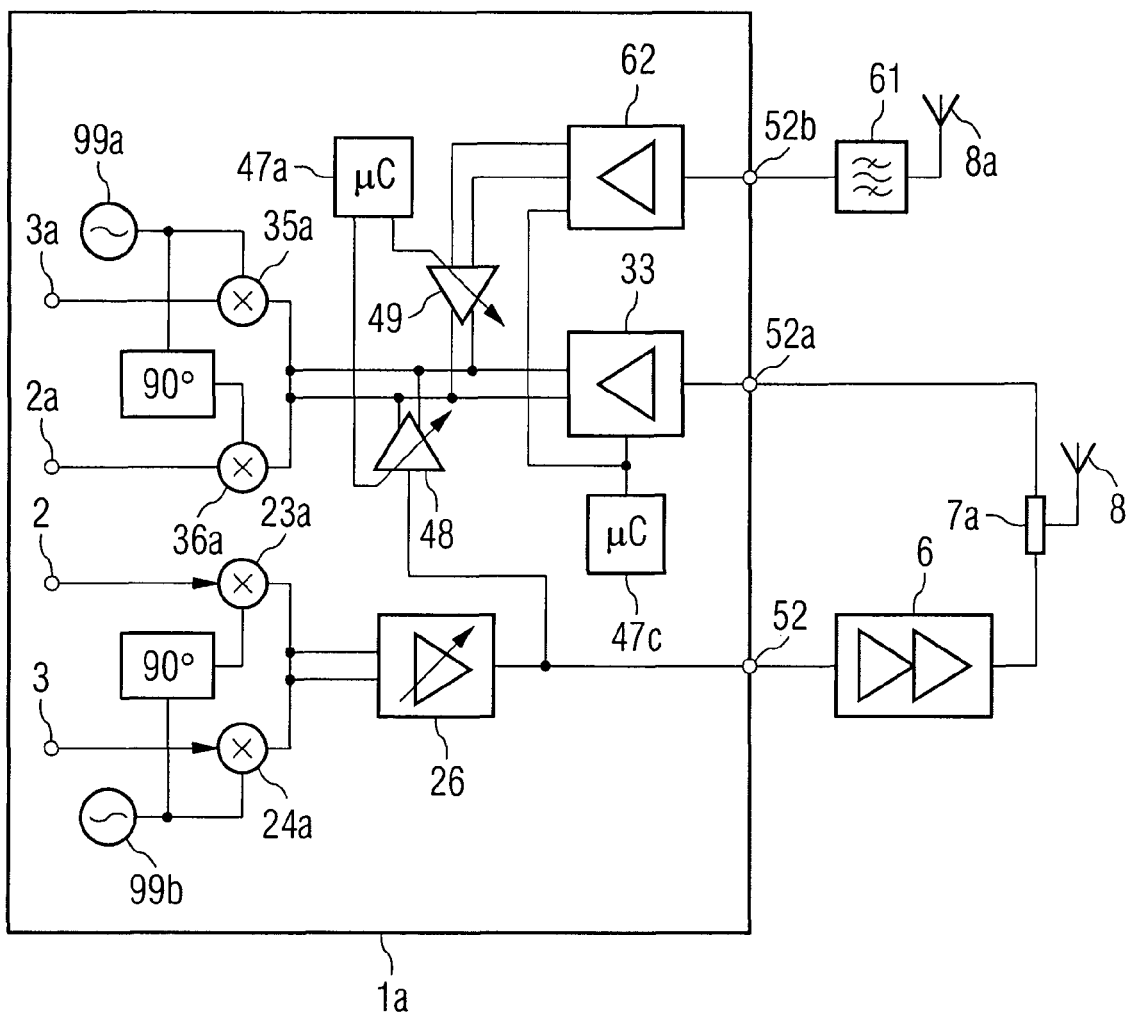
FIG. 1 shows a first embodiment of a transceiver arrangement for representing some aspects of the invention.

In the description following, further aspects and embodiments of the present invention are summarized. In addition, reference is made to the accompanying figures which form a part of the description and in which representations show how the invention can be embodied in practice. The embodiments of the drawings represent a summary in order to provide a better understanding of one or more aspects of the present invention. Identical reference symbols designate mutually corresponding similar parts. In one way, this is thus not an all-encompassing overview of the invention and is not intended for restricting the features or key elements of the invention to a particular embodiment. Instead, the various elements, aspects and features disclosed in the illustrative embodiment can be combined in various ways in order to achieve one or more advantages of the invention. It should be understood that other embodiments could be used and that structural or logical changes can be performed without departing from the core concept of the present invention. The elements in the drawings are not necessarily true to scale with respect to one another.

In one embodiment of the invention, the number of external components is reduced by a suitable combination of the modules or elements already existing in a transceiver arrangement. According to one embodiment, in a transceiver arrangement, a first receiving path with a first receive amplifier, and a second receiving path with a second receive amplifier, and a frequency conversion device are provided. A controllable coupling device in the transceiver arrangement is used for coupling an output of the first receive amplifier to an input of the frequency conversion device. The transceiver arrangement also comprises a control circuit for delivering a control signal to the coupling device in dependence on a parameter. The parameter is derived from a signal supplied to the first or second signal path.

The controllable coupling device and the control circuit are used for making a selection of which one of the two receiver amplifiers on the receive paths is to be coupled to the frequency conversion device. According to one embodiment of the invention, this can be done in that either precisely one of the two receive amplifiers is connected to the frequency conversion device or both receive amplifiers are coupled to the frequency conversion device based on the derived parameter. The last-mentioned coupling is effected in such a manner that signals from the receive amplifiers are supplied to the frequency conversion device in the correct phase. By supplying the two signals processed on the receive paths with the correct phase, the signal/noise ratio of the total signal is improved. Signal fluctuations of the receive signal caused externally can thus be advantageously compensated for. In addition, it is possible to optimize the various receive amplifiers on the receive paths for different applications and, nevertheless, to use them jointly if required.

In one embodiment of the invention, the control circuit can be arranged to detect a signal strength or a signal quality of a signal supplied at the first or second receive path. From the detected signal strength or quality, the parameter can be derived. In consequence, a decision about which receive path is coupled to the frequency conversion device is made based on the signal strength or, respectively, the signal quality of the signal present.

If necessary, in one embodiment both receive paths can be coupled to the frequency conversion device for improving the signal quality. The joint coupling of different signal paths is called, for example, diversity reception and such a receive arrangement is called a diversity receiver. In addition, it can be provided to optimize the circuit components within the two receive paths for different applications. For example, the first receive path can be equipped to receive a signal with a first or a second mobile radio standard. The second receive path, in contrast, is only used in one embodiment to amplify the signal according to the second mobile radio standard, diversity reception also being possible for the second mobile radio standard.

The signal processing shown can be advantageous when an input signal level is higher than a predetermined value so that the requirements for an inherent noise present on the receive paths or, respectively, a noise figure of the individual receive amplifiers is reduced. In a further embodiment of the invention, the transceiver arrangement additionally comprises a transmit path with a tap for delivering a transmit signal. A compensation circuit is coupled to the tap of the transmit path at the input end and to the input of the frequency conversion device of the second receive path at the output end. It is arranged in one embodiment to suppress a transmit signal component cross-feeding to the first or the second receive path. This makes it possible to simultaneously send and receive signals during the operation of the transceiver arrangement. In this embodiment, data errors in later signal processing due to transmit signal components cross-feeding onto the receive paths are prevented by the compensation circuit.

In one embodiment, it is conceivable to connect one of the two receive paths together with the transmit path to a common antenna. Using the compensation device, cross-feeding of a component of the transmit signal onto the receive path coupled to the antenna is prevented. This measure ensures adequate signal quality even at low signal levels of a received signal. In addition, an additional filter preceding the connection of the respective receive path is no longer necessary due to the arrangement with a compensation circuit. This reduces the number of external components needed. In one embodiment, a coupling between the outputs and the corresponding antennas is thus filter-less. This term means that the coupling does not comprise any additional filter with coils or charge storage provided especially for this purpose.

To improve the signal quality, the compensation circuit according to one embodiment may comprise a phase adjustment device by means of which it can supply the signal coupled out of the transmit path phase-inverted to the receive path. This provides for a substantial reduction of the transmit signal component cross-feeding to the receive path. For combining the signals of the first and second receive path in the correct phase, a phase adjustment device for changing the phase of a signal delivered by the respective receive amplifier is also provided in one of the two receive paths in one embodiment.

According to one embodiment of the invention, a signal is thus received via a first signal path and from this a parameter characterizing the received signal is determined. This parameter can represent, for example, a signal strength or a signal quality of the received signal. For example, the signal/noise ratio is available for a signal quality. This parameter is then evaluated. Thus, depending on the evaluation of the parameter, a decision can then be made about whether the signal is still to be received and processed via the first signal path. As an alternative, there is the possibility, on the one hand, to receive the signal via a second signal path and to process it further or to receive, combine and jointly further process the signal jointly via the first and second signal path. The latter possibility is called diversity reception. It is appropriate, in particular, when the signal strength or the signal quality changes based on parameters which cannot be influenced. This makes it possible to continuously ensure adequate signal quality and thus a high transmission rate.

The proposed method can be applied, in one embodiment, in a transceiver arrangement which is equipped for receiving signals according to various mobile radio standards.

Using a diversity receiver reduces the requirements for the individual circuit components on the signal paths without impairing the signal quality.

FIG. 1 shows one embodiment of a transceiver arrangement for receiving and transmitting signals according to various mobile radio standards. In the present case, the transceiver arrangement is arranged as an integrated circuit in a semiconductor body $1a$. The semiconductor body comprises on its surface a number of connecting contacts for supplying or delivering radio-frequency signals. The radio frequency signals supplied are amplified and processed further, the term signal processing generally meaning a frequency conversion to an intermediate frequency, digitization and/or subsequent demodulation. For processing the signals of different mobile radio standards, it is provided in one embodiment to arrange various circuit components in multiples. These are then optimized to a particular mobile radio standard with respect to the respective application.

Thus, it is provided, in one embodiment for the mobile radio standard UMTS/WCDMA to convey a data content in amplitude and in phase. Accordingly, it is suitable in one embodiment to amplify received signals by means of a receive amplifier which has as linear as possible a transfer characteristic in an input level range in order to minimize amplitude distortions. By comparison, the requirements for the linearity of a receive amplifier for signals according to the GSM mobile radio standard are distinctly lower. In this standard, a data content is only coded in phase as a result of which any amplitude distortion does not have any significant effects. Since, in addition, both mobile radio standards transmit and receive on different frequency channels, different receive paths can be provided for this purpose.

In the present illustrative embodiment, a first antenna $8a$ and a second antenna $8$ are connected to the transceiver arrangement in the semiconductor body $1a$. The first antenna $8a$ is coupled via a band pass filter $61$ to a first input connection $52b$. This is a part of a first receive path which comprises a first receive amplifier $62$. The first receive amplifier $62$ is arranged as a low-noise amplifier, for example with a very low noise figure.

The first receive path is used for receiving signals of the mobile radio standard GSM, among other things. Since this mobile radio standard uses signals with a constant envelope for transmitting data, no particularly high requirements with regard to a linear transfer characteristic are set for the receive amplifier $62$. Thus, distortion can occur due to a non-linear transfer characteristic in the receive amplifier $62$, particularly in the case of high input signal levels at the connection $52b$. However, this has no significant negative effects on the quality of reception of signals according to the GSM mobile radio standard via the first receive path.

The second antenna $8$ is connected to a duplexer $7a$. The duplexer, or hybrid coupler $7a$, is connected, on the one hand, to the input connection $52a$ of a second receive path at the input end and to an output tap $52$ of a transmit path. Between the output tap $52$ and the input of the duplexer $7a$, a power amplifier $6$ is additionally provided for the transmit path. The transmit path also comprises an adjustable amplifier $26$, the output of which is connected to the tap $52$. At the input end, the adjustable amplifier 26 is coupled to an IQ modulator. This IQ modulator is used for converting the signals applied at connections 2 and 3 with its real component I and its quadrature component Q to a signal having the output frequency. For this purpose, the IQ modulator contains two mixers 23a and 24a. The inputs are in each case connected to the connections 2 and 3. The local oscillator input of the first mixer 24a is connected to a phase locked loop 99b. The local oscillator input of the second mixer 23a is also connected to the phase locked loop 99b via a 90° phase shifter. The phase shift of 90° in the second local oscillator signal generates an IQ modulation with the signals supplied at connections 2 and 3. The total signal converted to the output frequency is amplified in the amplifier 26 with the set gain factor and supplied to the output tap 52.

The second receive path of the transceiver contains a controllable receive amplifier 33, the gain factor of which is adjustable via a control circuit 47c. At the input end, the amplifier 33 is connected to the second connection 52a. At the output end, the amplifier 33 is connected to an IQ demodulator of the two mixers 35a and 36a. The IQ demodulator converts an input signal supplied to it to an intermediate frequency with the aid of a local oscillator signal provided by the phase locked loop 99a and delivers a real component I and a converted quadrature component Q to the output connections 2a and 3a.

The second receive path is mainly used for receiving signals according to a mobile radio standard, the envelope of which is variable with time. This is also called a non-constant envelope. Such signals are used, for example, for the WDCMA/UMTS mobile radio standard or for the WLAN Standards 802.11 (Wireless Local Area Network). It is advantageous, therefore, in one embodiment if the input amplifier 33 used has a particularly good linear transfer characteristic in order to prevent distortion in the amplified signal and thus data errors.

For further signal processing on the first receive path, an adjusting device 49 with an adjustable phase shift is additionally provided. In addition, it can also be arranged for changing amplitude. The input of the adjusting device 49 is connected to the output of the receive amplifier 62 and the output is connected to the input of the IQ demodulator 35a, 36a on the second signal path. A signal received via the antenna 8a is amplified by the first receive amplifier 62 and supplied to the IQ demodulator for demodulation. As shown, the IQ demodulator is arranged both for demodulating signals received via the first receive path and for demodulating signals received via the second receive path.

For example, a signal according to the GSM mobile radio standard can be amplified via the first receive path and then demodulated in the IQ demodulator. To prevent signals coupled in via the second receive path from influencing the useful signal amplified on the first receive path, the second receive amplifier 33 on the second receive path is deactivated by the control circuit 47c. Correspondingly, the first receive amplifier 62 is switched off on reception of a signal via only the second receive path in one embodiment.

In other communications systems, for example WCDMA/UMTS, operating modes for a high data transmission rate are provided. Such an operating mode is, for example, the HSDPA mode. The WLAN or 802.11 mobile radio standards also have high data transmission rates. In principle, these types of mobile radio standards make high demands on the signal quality and the circuit components within the receive signal path. One factor of signal quality is the so-called signal/noise ratio, which can be made worse by inherent noise within the receive amplifier. So that a high data transmission speed is still guaranteed especially in the case of small signal/noise ratios, amplifiers with a very low noise figure are employed according to one embodiment of the invention. These worsen the signal/noise ratio of the received signal only insignificantly. Such a low-noise amplifier does not need a very good linear transfer characteristic especially in the case of small signal levels since there is no risk of distortion due to the low signal levels.

For this reason, it is provided in one embodiment to make a decision about the first or second receive path to be used based on the signal level for an operating mode with high data transmission rates. At low signal levels of a signal received via the antenna 8a or 8, respectively, the first signal path and the amplifier 62 with particularly low noise is thus used. The received signal is amplified and supplied to the IQ demodulator. The second amplifier 33 on the second signal path is deactivated in this mode. At very high signal levels and thus a very good signal/noise ratio, the amplifier 62 on the first signal path would cause additional distortion and thus data errors.

For this reason, the amplifier 62 on the first signal path is deactivated in a second operating mode and the signal now received via the antenna 8 is only amplified by the second amplifier 33 and supplied to the IQ demodulator. Although this has a greater noise figure, it also has a much better linear transfer characteristic.

At signal levels of a received signal which are between these two ranges, both signal paths are used for the amplification and the further processing. This procedure is called diversity reception. Both amplifiers on the first and second receive path are activated for this purpose. A signal received via the antennas 8 and 8a is amplified in both amplifiers. The signal delivered by the receive amplifier 62 is changed by the phase shifter 49 in such a manner that it is supplied to the signal delivered by the receive amplifier 33 in the correct phase. The phase shifter 49 is employed in one embodiment to equalize different delays within the two receive paths and to prevent destructive interference between the two amplified signals on the first and second receive path.

Combining the total signal in the correct phase further improves the signal/noise ratio. In consequence, the phase shifter is used to add the two signals delivered by the receive amplifiers 33 and 62. The common signal is further processed in the IQ demodulator. Thus, a good signal/noise ratio can be achieved over a wide range of an input signal level. This allows signals with high data transmission rates to be transmitted in the total input signal range. In addition, it furthermore remains possible to receive or deliver signals according to various mobile radio standards in parallel.

In practice, mobile communication signals are received or sent simultaneously. In the transceiver shown, for example, mobile radio signals according to the GSM standard can be received, via the antenna 8a, amplified and processed further while at the same time transmit signals according to the mobile radio standard UMTS are delivered via the antenna 8. It is also possible to receive signals with low data transmission rates according to the UMTS/WCDMA mobile radio standard via the antenna 8 and to process them on the second receive path while the transmit path radiates signals via the antenna 8.

During the simultaneous reception or transmission, respectively, of signals, unwanted crossfeeding of transmit signal components into the respective receive path can occur due to the use of the duplexer 7a shown and the spatial vicinity of the two antennas 8, 8a, respectively. This can influence the signal/noise ratio or lead to later demodulation of additional data errors.

For this reason, an additional correction circuit with a compensation circuit 48 is provided. This is coupled to the transmit path at the input end and to the input of the frequency conversion device on the second signal path at the output end. In one embodiment, the compensation device 48 comprises a controllable phase shifter. This is driven like the controllable phase shifter 49 by the microprocessor 47$a$ which receives its control signals via evaluation of the signals delivered by the IQ demodulator. In this embodiment, the microprocessor 47$a$ adjusts the phase shifter 48 in such a manner that a transmit signal component of the transmit path is supplied with inverted phase to the signal of the receive path. This greatly reduces a transmit signal component cross-feeding onto the receive path and improves the signal/noise ratio of the received useful signal. This active control for suppressing a cross-feeding transmit signal component within the transceiver allows the number of external components to be reduced, particularly the number of external filters on the receive path or transmit path, respectively.

Thus, additional band pass filters at the input connection 52$a$ and the output tap 52 can be omitted. The demands on the duplexer 7$a$ with respect to suppression of the transmit signal on the receive path are also reduced. Due to the fact that in one embodiment the amplifier 33 of the second receive path is only used for high signal levels at high data transmission rates, an additional narrow-band SAW filter for suppressing interference signals from the transmitter between the duplexer 7$a$ and the amplifier 33 can be omitted.

Figure 2:
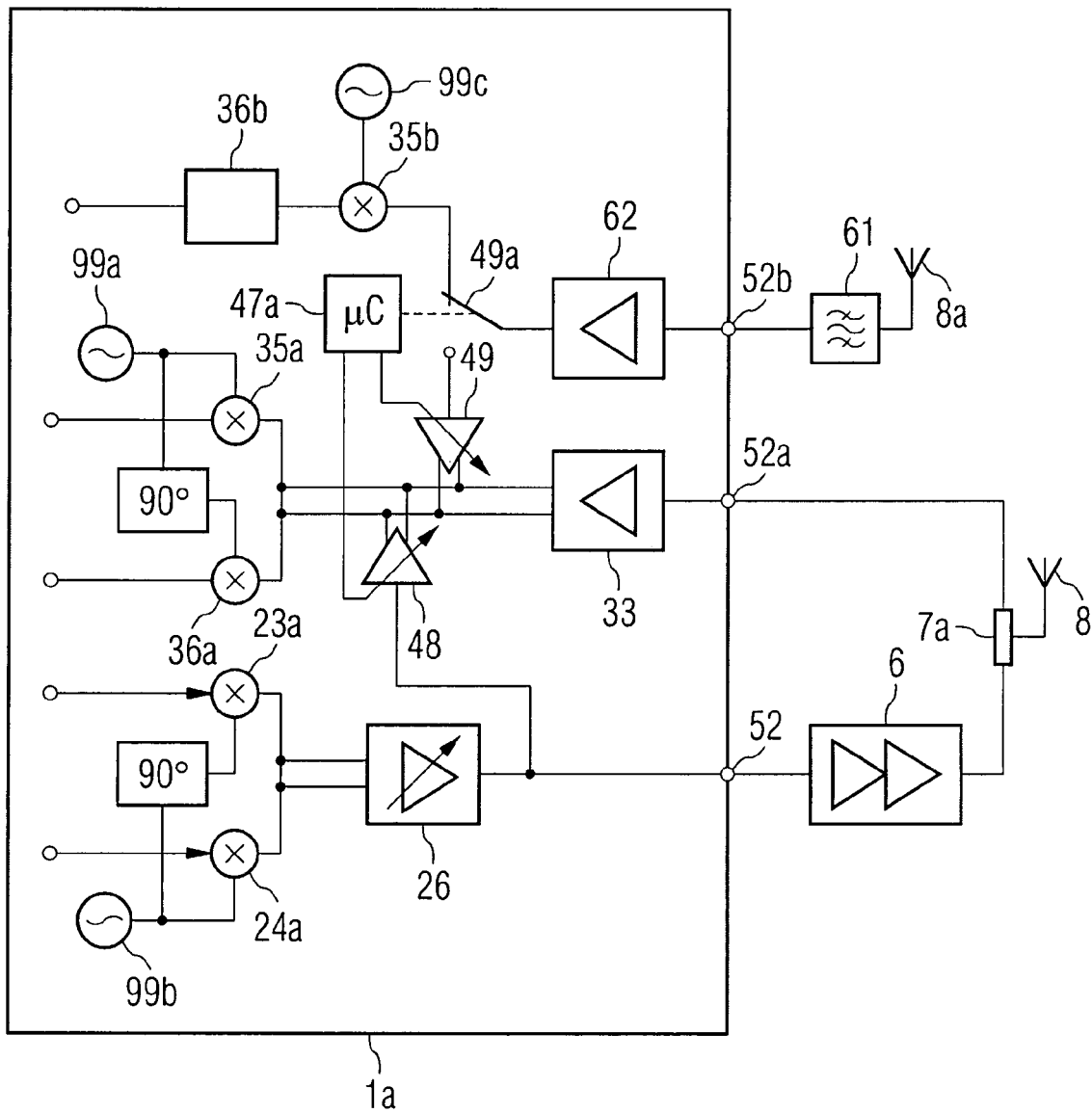
FIG. 2 shows a second embodiment of a transceiver arrangement for representing further aspects of the invention.

FIG. 2 shows a further embodiment of the invention. Components with identical action or function carry the same reference symbols. In this embodiment, an additional demodulation and frequency conversion device is provided for the first receive path. In detail, the first receive path contains a switch 49$a$ which is controlled by the microprocessor 47$a$. The switch 49$a$ applies the output of the receive amplifier 62 of the first receive path either to the input of the phase shifter 49 or to an input of a frequency conversion device 35$b$, respectively. This is connected to a local oscillator 99$c$ and delivers the frequency-converted signal to the demodulation device 36$b$.

The embodiment allows a first signal according to a first mobile communication standard to be received simultaneously via the antenna 8$a$ and to be processed on the first receive path. In addition, a second signal according to a further mobile radio standard can be received via the second antenna 8 and processed further on the second receive path. Furthermore, there are no restrictions with regard to the choice of signals or of the mobile radio standards used.

Depending on signal level or, respectively, a field strength of the received signal, processing is carried out on the first or on the second receive path, respectively. If necessary, the microprocessor 47$a$ also switches the switch 49$a$ and couples the output of the receive amplifier 62 to the phase shifter 49. As a result, the transceiver arrangement according to the invention changes to an operating mode for diversity reception and is thus particularly suitable for receiving high data transmission rates.

Figure 3:
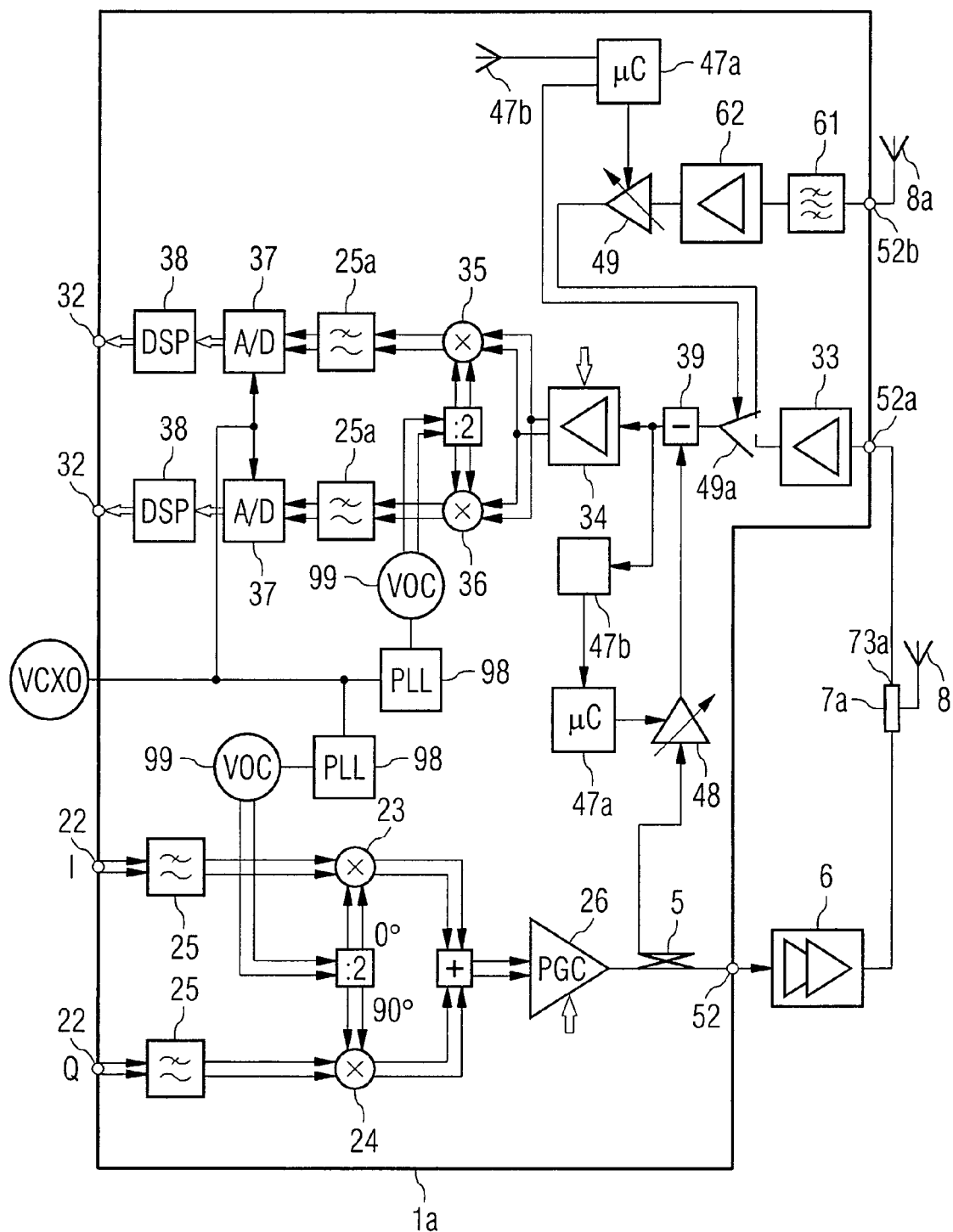
FIG. 3 shows a third embodiment of a transceiver arrangement.

FIG. 3 shows a further embodiment of the transceiver arrangement according to the invention. Here, too, identical reference symbols are used for functionally identical components. The transceiver arrangement shown is constructed as an integrated circuit in a semiconductor body. In the illustrative embodiment, a reference signal is derived from a crystal oscillator VCXO and supplied to the phase locked loops 98 within the semiconductor body. This is connected to the voltage-controlled oscillators 99 which provide a local oscillator signal for the IQ modulators of the transmitting path and, respectively, the demodulators of the second receive path. The transmit path comprises an input connection 22 for supplying the in-phase component I and the quadrature component Q. These signals, also called baseband components, are low-pass filtered in filters 25 and supplied as push-pull signals to the inputs of the mixers 23 and 24, respectively, of the IQ modulator.

The IQ modulator with its two mixers converts the components to the output frequency. At the output end, the modulator is connected to the amplifier 26 which can be adjusted in discrete values in one embodiment. The output of the amplifier 26 is connected to the tap 52 of the transceiver via an output element 5. The amplifying device 26 performs preamplification which, on the one hand, compensates for signal attenuation due to the coupling-out at the output element and provides a suitable signal level for the transmit amplifier 6. The output element 5 is also used for matching the impedance of the output connection 52 to the input of the amplifier 6. The coupling element 5 is coupled to the transmit path inductively via a contact wire. In contrast to capacitive coupling, inductive coupling has much less influence on the signal path of the transmit path and, due to the coupling, has a phase which is already inverted with respect to the transmit signal.

In a suitable embodiment, the coupling line can be additionally used for shielding the signal line and thus for reducing unwanted crosstalk. On the receive path, the output of the amplifier 33 is connected to the switch 49$a$. This, in turn, is connected to the adding element 49, the output of which is connected to a second low-noise and adjustable amplifier 34. In addition, it is coupled to a power detector 47$b$. The low-noise amplifier 34 amplifies the received signal and supplies it to the demodulator which contains the two mixers 35 and 36 and is arranged for push-pull signal processing. The two mixers 35 and 36 are supplied with a local oscillator signal derived from the voltage-controlled oscillator 99.

This local oscillator signal is obtained from the frequency of the output signal of the oscillator 99, an additional phase shift by 90° of the two local oscillator signals with respect to one another occurring during the frequency division. As a result, simultaneous decomposition into the real component I and the quadrature component Q occurs during the frequency conversion. The respective components are supplied via a low-pass filter 25$a$ to an analogue/digital converter 37 which digitizes the frequency-converted signal and delivers it to signal processors 38 for further processing.

The power detector 47$b$ comprises in one embodiment a rectifier diode for rectifying the received signal. From the rectified signal, it determines the power and supplies this value to a microcontroller 47$a$. In this process, the temperature-dependence of the semiconductor diode must be taken into consideration. As an alternative, the power detector can also evaluate a direct-signal component in the received signal which is produced by a second-order harmonic distortion. This occurs with cross-feeding of the transmit signal into the receive path. The intensity of the direct-signal component is thus a measure of the cross-feeding of the transmit signal.

In one embodiment, the microprocessor 47$a$ determines the amplitude and the phase for the compensation circuit 48 from the data of the power measurement with the aid of an algorithm.

On the first receive path, the input connection 52$b$ is connected directly to the antenna 8$a$. Furthermore, the input connection 52$b$ is connected to a band pass filter 61 which is integrated in the semiconductor body 1$a$. For example, this band pass filter can be formed by a BAW (Bulk Acoustic Wave) filter 61. The output of the band pass filter 61 is connected to the receive amplifier 62. At the output end, the latter, in turn, is connected to the adjustable phase shifter 49. The output of the phase shifter 49 is connected to the switch 49a which is controlled by the microprocessor 47a. The microprocessor 47a thus determines with the aid of the power signal delivered by the power detector 47b, on the one hand, which of the two receive amplifiers 33 or 62, respectively, is to be connected to the adding element 39. For diversity reception, it is additionally possible to couple both outputs of the amplifiers 33, 62 to the adding element 39 via the switch 49a.

The use, according to one embodiment of the invention, of different amplifiers which can be optimized for different mobile radio standards allows a diversity receiver to be implemented which ensures adequate signal quality over a wide range of an input signal level with mobile radio standards with high data transmission rates. In addition, both receive paths can be used for an operation at lower transmission rates without requiring additional external components, for example in the form of filters. This reduces the requirements for the individual amplifiers with regard to signal quality, the noise figure and the linear transfer characteristic.

The number of necessary external components of a transceiver integrated in a semiconductor body is reduced especially in the case of transceivers with different operating modes, for example TDMA/CDMA transceivers for the WCDMA/UMTS and GSM or EDGE mobile radio standards. Cross-feeding of transmit signal components onto the receive paths can be corrected by the embodiment of the compensation circuit within the transceiver according to the invention without requiring additional band pass filters for suppressing the transmit signal components.

In this arrangement, a signal received via a signal path is evaluated and, for example, its signal/noise characteristic is determined. From this parameter, which characterizes a property of the received signal, a decision is made about which signal path should be used for the further reception. At the same time, a cross-feeding component of the signal to be transmitted into the received signal is compensated for by coupling out signal components of a signal to be transmitted. This is achieved by adding with inverted phase which corresponds to a destructive addition. The cross-feeding transmit signal component is extinguished substantially by this measure in the received signal.

Although specific embodiments have been illustrated and described herein, it will be appreciated by those of ordinary skill in the art, that any arrangement which is calculated to achieve the same purpose may be substituted for the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention should, therefore, be determined with reference to the appended claims along with the scope of equivalents to which such claims are entitled.

It is emphasized that the Abstract is provided to comply with 37 C.F.R. section 1.72(b) requiring an abstract that will allow the reader to quickly ascertain the nature and gist of the technical disclosure. It is submitted with the understanding, that it will not be used to interpret or limit the scope or meaning of the claims.

The invention claimed is:

1. A transceiver arrangement, comprising:
   a first receive path comprising a first connection and a first receive amplifier;
   a second receive path comprising a second connection, a second receive amplifier, and a frequency conversion device;
   a controllable coupling device configured to couple an output of the first receive amplifier to an input of the frequency conversion device on the second signal path; and
   a control circuit configured to provide a control signal to the coupling device for selectively combining signals delivered by the first and second receive amplifiers in the correct phase based on a parameter which is derived from a signal present at the first connection or second connection, or both,
   wherein the signals are selectively combined prior to the frequency conversion device; and
   wherein the parameter comprises a signal to noise ratio or a mobile radio standard.

2. The transceiver arrangement of claim 1, further comprising:
   a transmit path comprising a tap to provide a transmit signal;
   a compensation circuit coupled to the tap of the transmit path at an input end thereof, and to an input of the frequency conversion device at the output end thereof, and configured to suppress a transmit signal component cross-feeding onto the first or second receive path.

3. The transceiver arrangement of claim 2, wherein the compensation circuit comprises an output element configured to couple out a component of the signal to be delivered by the transmit path.

4. The transceiver arrangement of claim 1, wherein the controllable coupling device is configured to couple the output of the first receive amplifier, to the frequency conversion device in a first switching state and the outputs of the first and second receive amplifier to the frequency conversion device in a second switching state.

5. The transceiver arrangement of claim 1, wherein the control circuit comprises a device configured to detect a signal strength or a signal quality of a signal that is derived from a signal at the first connection or the second connection for generating a parameter.

6. The transceiver arrangement of claim 1, wherein the first receive amplifier is configured to exhibit a smaller noise figure than the second receive amplifier.

7. The transceiver arrangement of claim 1, wherein the first receive path is coupled to a first antenna and the second receive path is coupled to a second antenna.

8. The transceiver arrangement of claim 7, wherein the second connection of the second receive path is coupled to the second antenna via a coupling element, and wherein the tap of the transmit path is coupled to the second antenna via the coupling element.

9. The transceiver arrangement of claim 7, further comprising a filter device arranged between the first connection and the first antenna.

10. The transceiver arrangement of claim 7, wherein the coupling between the second connection and the second antenna is arranged without filter therebetween.

11. The transceiver arrangement of claim 1, wherein the first and the second receive amplifiers have a different linear transfer characteristic or a different noise figure from one another.

12. The transceiver arrangement claim 1, wherein a noise figure of the first receive amplifier is smaller than a smaller noise figure of the second receive amplifier.

13. A transceiver arrangement, comprising:
a first signal path configured to amplify a received signal with a signal strength;
a second signal path configured to amplify the received signal;
a frequency conversion device; and
a selection circuit configured to selectively couple the first signal path, the second signal path or both signal paths to the frequency conversion device based on a parameter derived from the received signal,
wherein the signals on the first and second signal paths are selectively combined prior to the frequency conversion device; and
wherein the parameter comprises a signal to noise ratio or a mobile radio standard.

14. The transceiver arrangement of claim 13, wherein the selection circuit comprises a controllable phase adjusting device connected to the first signal path at an input end thereof and to an output of the second signal path at an output end thereof, and configured to combine signals of the first and second signal path in the correct phase.

15. The transceiver arrangement of claim 13, further comprising:
a transmit path configured to amplify a signal to be transmitted;
a compensation device configured to compensate for a signal component cross-feeding from the transmit path onto the first or second receive path, or both.

16. The transceiver arrangement of claim 13, further comprising:
a first antenna coupled to the first receive path;
a second antenna coupled to the second receive path; and
wherein the transceiver arrangement is configured to receive the signal with the aid of the first and second antenna in a diversity mode that is set by the selection circuit.

17. The transceiver arrangement of claim 13, wherein the transceiver arrangement is configured to receive and process signals according to a first and at least one second mobile communication standard, and wherein the second signal path is adopted to amplify a signal only in accordance with the first communication standard.

\* \* \* \* \*